United States Patent
Groell

(10) Patent No.: US 9,127,923 B2
(45) Date of Patent: Sep. 8, 2015

(54) PROBE SYSTEM AND METHOD FOR OPERATING A PROBE SYSTEM

(75) Inventor: Klaus Groell, Waging am See (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 546 days.

(21) Appl. No.: 13/477,688

(22) Filed: May 22, 2012

(65) Prior Publication Data
US 2012/0297906 A1    Nov. 29, 2012

(30) Foreign Application Priority Data
May 26, 2011    (DE) .......................... 10 2011 076 504

(51) Int. Cl.
| | | |
|---|---|---|
| G01B 5/02 | (2006.01) |
| G01B 5/012 | (2006.01) |
| G01B 21/04 | (2006.01) |
| H04Q 9/00 | (2006.01) |

(52) U.S. Cl.
CPC .............. *G01B 5/012* (2013.01); *G01B 21/047* (2013.01); *H04Q 9/00* (2013.01); *G01B 2210/58* (2013.01)

(58) Field of Classification Search
None
See application file for complete search history.

(56) References Cited

U.S. PATENT DOCUMENTS

| | | | |
|---|---|---|---|
| 6,951,060 B2 | 10/2005 | Groell | |
| 2004/0183789 A1* | 9/2004 | Schopf ........................ | 345/173 |
| 2006/0173651 A1* | 8/2006 | Ferrari et al. ................ | 702/168 |
| 2008/0110039 A1* | 5/2008 | Groell et al. .................... | 33/558 |
| 2009/0126214 A1* | 5/2009 | Eisenberger et al. ........... | 33/558 |
| 2011/0094117 A1 | 4/2011 | Groell | |

FOREIGN PATENT DOCUMENTS

| | | |
|---|---|---|
| EP | 1 445 747 | 8/2004 |
| EP | 2 317 278 | 5/2011 |
| WO | 96/36028 | 11/1996 |
| WO | 2004/057552 | 7/2004 |

OTHER PUBLICATIONS

Selected pages from Core Specification of the Bluetooth, Version 1.2, Nov. 5, 2003.
Selected pages from a technical manual of a radio transceiver device produced by Atmel, 2009.
Selected pages from a technical manual of a radio transceiver device produced by Cypress, Apr. 2, 2007.
Selected pages from a technical manual of a radio transceiver device produced by Nordic Semiconductor, Jul. 2007.
Selected pages from telecommunication standard IEEE 802.15.4, published on Oct. 1, 2003.
Response to EPO Communication, dated Jan. 9, 2015, filed in corresponding European Patent Application No. 12156305.0.*
Notice of Opposition, dated Aug. 13, 2014, filed in corresponding European Patent Application No. 12156305.0.

* cited by examiner

*Primary Examiner* — Robert R Raevis
(74) *Attorney, Agent, or Firm* — Kenyon & Kenyon LLP

(57) ABSTRACT

A probe system includes a probe head and a transceiver element. The probe head and the transceiver element are configured to allow a signal communication to be established between them, optionally in two modes, such that in the first mode, the transceiver element is able to transmit a signal, which is able to be received by the probe head, and in response to the received signal, the probe head is able to transmit an acknowledge signal. In the second mode, when a stylus is touched, a sensor element is able to generate a sensor signal, which is transmittable by the probe head and receivable by the transceiver element, and in response to the received sensor signal, the transceiver element is able to transmit an acknowledge signal.

14 Claims, 3 Drawing Sheets

PROBE SYSTEM AND METHOD FOR OPERATING A PROBE SYSTEM

CROSS-REFERENCE TO RELATED APPLICATIONS

The present application claims priority to Application No. 10 2011 076 504.2, filed in the Federal Republic of Germany on May 26, 2011, which is expressly incorporated herein in its entirety by reference thereto.

FIELD OF THE INVENTION

The present invention relates to a probe system, which includes, for example, a probe head having a stylus and a transceiver element, in which wireless communication of signals or information is possible between the probe head and the transceiver element. Furthermore, the present invention relates to a method for operating such a probe system.

BACKGROUND INFORMATION

A probe system normally includes a mobile probe head and a stationary transceiver element. The probe head in the form of a momentary-contact switch has a deflectable stylus, which outputs a signal when deflected out of its rest position or when the stylus is contacted, and which, in particular, is used for determining the position of workpieces that are clamped in material-processing machines, e.g., machine tools. In this context, the rest position of the stylus should be understood to be a position in which the stylus has no contact with the workpiece to be probe-contacted. When the stylus is in contact with the workpiece, the stylus is deflected out of its rest position, and a suitable transducer generates an electrical sensor signal if the deflection exceeds a specified probing threshold. The electrical sensor signal is often converted into a radio and/or an infrared signal, thereby making it possible to achieve a contactless and wireless signal communication with the transceiver element of the probe system.

In this transceiver element, the wirelessly communicated signals are reconverted into electrical signals. The transceiver element of the probe system is connected to sequential electronics, to which the electrical signals are forwarded for analysis, and ultimately provided to the control of the machine tool, for example. The position of the workpiece to be measured can then be determined based on the measured position of the particular machine tool part.

The use of a corresponding probe head therefore makes it possible to scan the contour of a workpiece, for example, but also the contour of a tool. If a workpiece is scanned, the probe head normally is arranged in a manner that allows it to move relative to the transceiver element, and if a tool is scanned, the probe head is usually mounted so as to be stationary relative to the transceiver element.

A probe system of the type mentioned above, in which wireless signal communication via infrared light is provided, is described in European Patent No. 1 445 747.

European Published Patent Application No. 2 317 278 describes a probe system in which certain signals are communicated by light waves and certain signals are communicated by radio waves.

SUMMARY

Example embodiments of the present invention provide a probe system and a method for operating a probe system, which are generally suitable for achieving a high measuring accuracy. In particular, example embodiments of the present invention make it possible to achieve an operation that is substantially immune to interference also at a minimal energy requirement of the probe head of a probe system, for example.

According to example embodiments of the present invention, probe system includes a transceiver element and a probe head provided with a stylus and a sensor element. The probe head and the transceiver element are configured to allow a signal communication to be established between them, optionally in two modes. It should be understood that communication refers to, for example, successfully sending and receiving signals.

In the first mode, a signal able to be received by the probe head is transmittable from the transceiver element. In response to the received signal from the transceiver element, the probe head is able to send an acknowledge signal to confirm successful reception. In the second mode, when the stylus is touched, the sensor element is able to generate a sensor signal, which is transmittable from the probe head and receivable by the receiver element, and the transceiver element is able to send an acknowledge signal in response to the received sensor signal.

The sensor signal which the sensor element is able to generate includes probe contact information, so that the sensor signal acts as a carrier of the probe contact information. The probe contact information provides information as to whether the stylus touches a body to be measured. All signals, especially also the sensor signal, may be provided as radio signals. To achieve high measuring accuracy, the sensor signal may be transmitted to the transceiver element as quickly as possible. For this reason, a largely interference-free signal communication should be established, because interference leads to repeated transmissions of the sensor signal and thus slows the signal communication over all.

In the first mode, the probe system is configured such that the probe head is able to send a signal that would trigger a response in the transceiver element only in response to a signal transmitted by the transceiver element. In the second mode, the probe system is configured such that the transceiver element is able to send a signal that would trigger a response in the probe head only in response to a signal that is transmitted by the probe head. In the second mode, the signal communication within the probe system is synchronized from the direction of the probe head, so that the times during which the probe head is able to receive depend on events that the probe head executes itself. These events, for example, could represent the transmission of signals by the probe head.

The sensor element may be arranged as a mechanically acting element, e.g., a strain gauge or a piezo element, or as an optically acting element, e.g., a photovoltaic element, in an optical system.

In the second mode, once the sensor signal coming from the probe head has been received, the transceiver element is able to transmit another signal, with whose aid the termination of the second mode or a switch from the second mode to the first mode is able to be triggered. The transmission of the additional signal thus is connected to the transmission of the acknowledge signal, and therefore has a causal relationship with the preceding transmission of a signal by the probe head. In the second mode, the transceiver element is basically unable to transmit or output a signal autonomously without having received a prior signal from the probe head.

The probe system may be configured such that a signal communication, e.g., a wireless signal communication, is able to be implemented on only a single channel, for example, a radio channel.

In the first mode, the probe head is ready to receive during a particular time period, and the signal from the transceiver element is transmittable during another time period. The time period for the ready-to-receive state is longer than the time period during which the signal is transmittable.

The ready-to-receive state of the probe head may be deactivated temporarily in both modes during a particular time period. This time period falls at least partially into the time between the transmission of two adjacent signals by the probe head. Within the time period during which the ready-to-receive state of the probe head is deactivated, the probe head is unable to receive any signals from the transceiver element.

Furthermore, the probe system may be operated in a third mode, e.g., a transition mode, when switching from the first mode to the second mode. In the third mode, the probe head and the transceiver element are ready to receive, but neither the probe head nor the transceiver element is able to transmit signals. As an alternative or in addition, the probe system may be operable in the third mode also during the switch from the second mode to the first mode.

Furthermore, example embodiments of the present invention provide a method for operating a probe system having the above-described components. The probe head and the transceiver element are configured to allow a signal communication to be established between them, optionally in two modes, so that in the first mode, the transceiver element transmits a signal which is received by the probe head, and the probe head transmits an acknowledge signal in response to the received signal. In the second mode, the sensor element generates a sensor signal when the stylus is touched, which signal is transmitted by the probe head and received by the transceiver element, the transceiver element transmitting an acknowledge signal in response to the received sensor signal.

In the second mode, the probe head may send signals in defined time intervals $\Delta tb$, which signals include an additional item of information, the probe head temporarily being ready to receive during a time period $\Delta tr$ following the transmission of one of these signals, and the ready-to-receive state being deactivated even before transmitting the next of these signals. The particular time period $\Delta tr$ during which the probe head is ready to receive is, for example, shorter than the time period $\Delta ti$ of the ready-to-receive state of the probe head. Additional information may include information that differs from this probe-contact information and that, for example, signals the readiness of the probe head. The ratio $\Delta tr/\Delta tb$ of the time periods is, for example, less than $2/3$, e.g., less than $1/2$, in particular, less than $1/4$.

The transceiver element may transmit the signal during a particular time period, and the probe head may be ready to receive during a further time period, the further time period during which the ready-to-receive state is activated, being longer than the time period in which the signal is transmitted. The additional time period during which the ready-to-receive state of the probe head is activated, for example, may have at least more than twice the length of the time period during which the signal is transmitted.

Furthermore, in the change from the first mode to the second mode, the probe system is able to be operated in a third mode. In the third mode, the sensor element is switched on, and the probe head and the transceiver element are ready to receive, but signals are sent neither from the probe head nor the transceiver element.

The measures described herein allow, for example, a probe head to be operated in an energy-saving manner without having to expect any delays caused by interference in the signal transmission. This notwithstanding, the probe head does not take up a radio channel in the first mode, so that several probe heads are able to share a common channel without any problems.

Further features and aspects of example embodiments of the present invention are described in more detail below with reference to the appended Figures.

DETAILED DESCRIPTION

Figure 1:
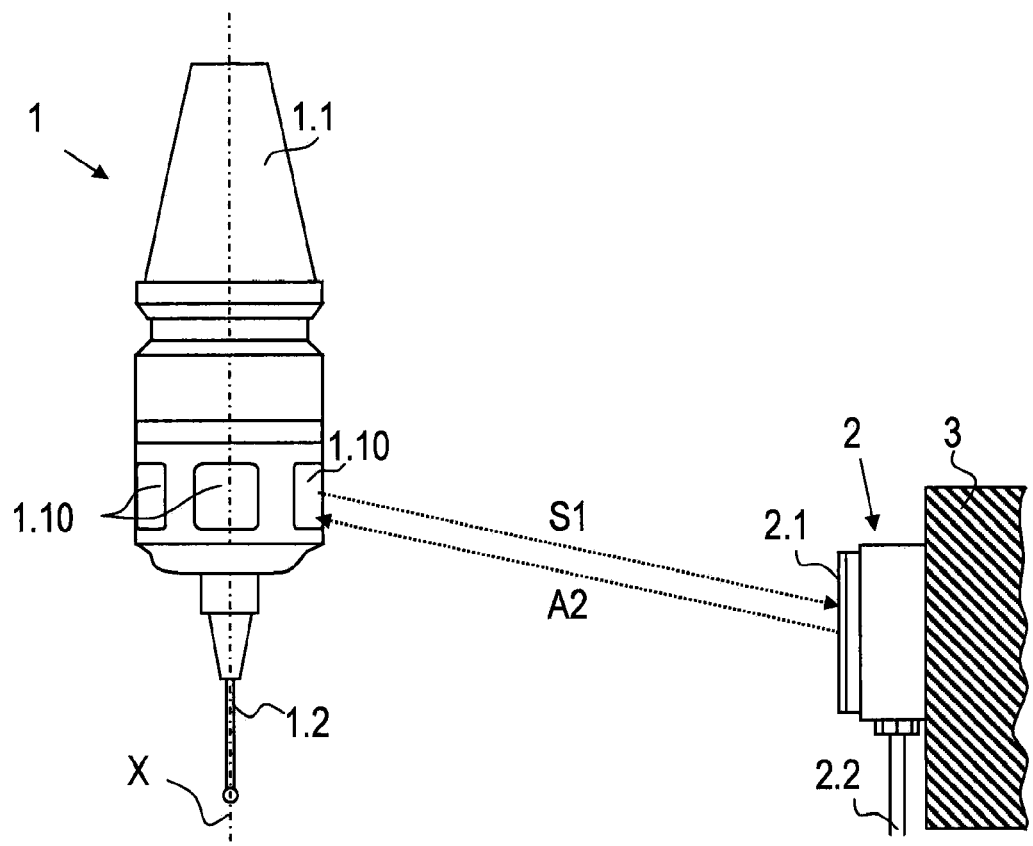
FIG. 1 is a side view of a probe system.

FIG. 1 illustrates a probe system, which includes a probe head 1 and a transceiver element 2. Probe head 1 may be clamped into a spindle of a machine tool with the aid of a clamping cone 1.1. Longitudinal axis X of probe head 1 simultaneously constitutes the center axis of clamping cone 1.1. Cylindrical stylus or pin 1.2, which has a probe-contact sphere at one end, is provided on probe head 1 parallel and concentrically with respect to longitudinal axis X.

Figure 2:
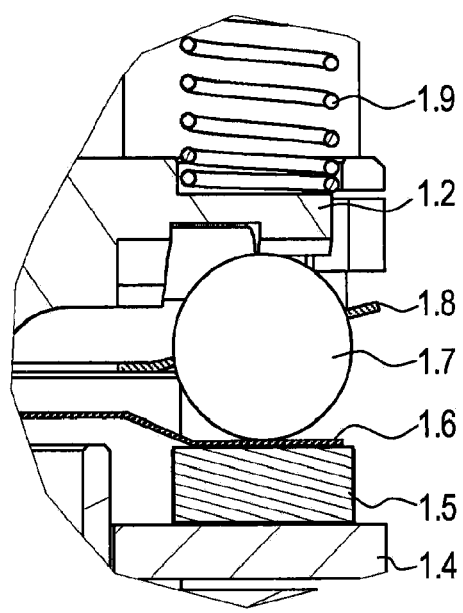
FIG. 2 is a detail view of a probe head having a sensor element.

FIG. 2 is a partial view of the interior of probe head 1. Provided on a circuit board 1.4 are a total of three pressure-sensitive sensor elements 1.5, of which only one is shown in the view in FIG. 2. Arranged on the surface of each sensor element 1.5 is a diaphragm 1.6, which is touched by a sphere 1.7, holder 1.8 accurately holding spheres 1.7 in place in a predetermined position relative to sensor elements 1.5. An arm of stylus 1.2, which is prestressed by a spring 1.9, rests on each sphere 1.7. A battery is provided in probe head 1 in order to power probe head 1.

Figure 4:
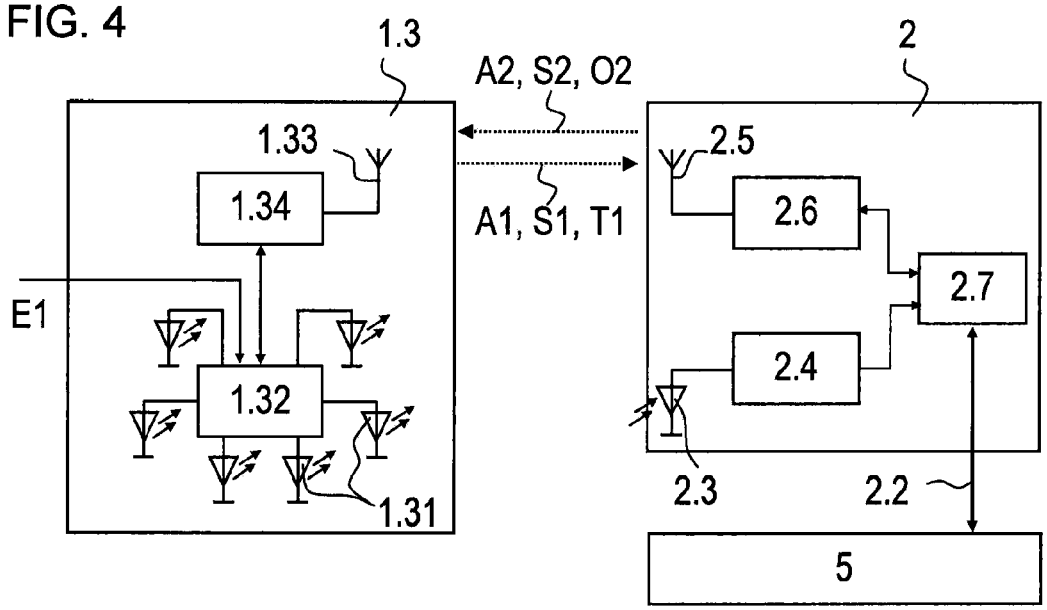
FIG. 4 schematically illustrates a transceiver unit of the probe head and the transceiver element.

Furthermore, probe head 1 has windows 1.10, which are permeable both by optical waves and radio waves. As illustrated in FIG. 4, a transceiver unit 1.3 is arranged inside probe head 1. It includes light sources 1.31, which are supplied by the battery in probe head 1 and arranged at an offset across the periphery of probe head 1. In the example illustrated, six light sources 1.31 are provided on probe head 1, each offset by 60° along a circumferential line on probe head 1. As schematically illustrated in FIG. 4, light sources 1.31 are actuated by CPU 1.32 arranged in probe head 1. Probe head 1 does not have a sensor for light waves, so that probe head 1 is unable to receive any signals based on light waves.

In addition, a radio transceiver 1.34 having an antenna 1.33 is provided in probe head 1. For example, antenna 1.33 is arranged behind windows 1.10, in the form of a circumferential wire in probe head 1.

In the example illustrated, transceiver element 2 is fixed in place on a stationary component 3 of the machine tool and has a window 2.1, which is permeable by optical waves and also by radio waves. Arranged behind this window are an opto-electronic receiver 2.3 and an additional radio transceiver 2.6 having an antenna 2.5 (cf. FIG. 4). In addition, transceiver element 2 includes an analog-digital converter 2.4 and an integrated circuit 2.7, e.g., in the form of an FPGA (Field-Programmable Gate Array) element. As an alternative, a trigger circuit, possibly having a controllable amplifier, also may be provided in transceiver element 2.

For its power supply, transceiver element 2 is connected to the power supply system via a multicore cable 2.2. Via cable 2.2, transceiver element 2 furthermore is electrically connected to subsequent electronics 5, which may be a numerical control, for example, for the respective machine tool. In the exemplary embodiment illustrated, a bidirectional data bus connection is provided between transceiver element 2 and subsequent electronics 5.

Figure 3:
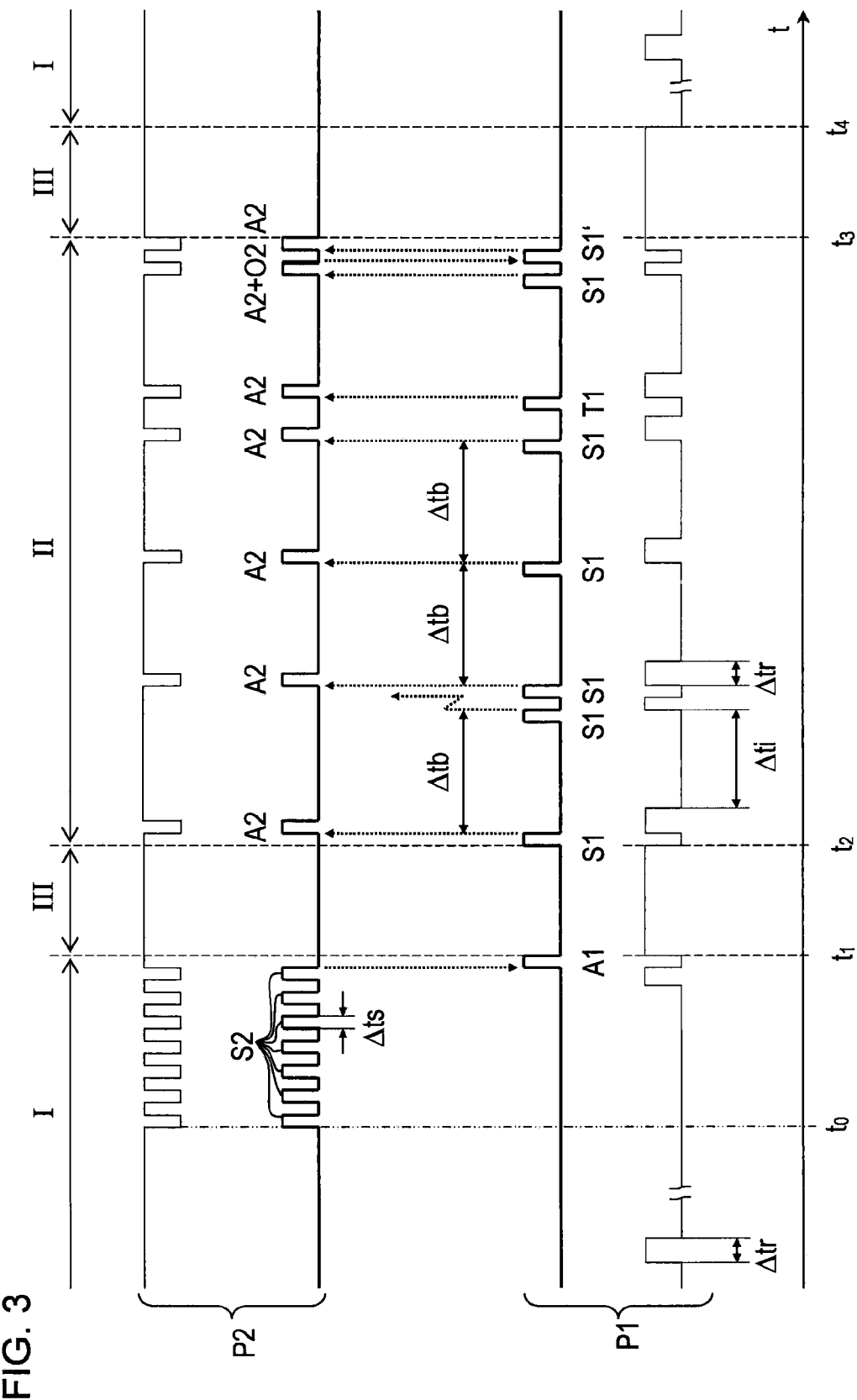
FIG. 3 is a time diagram for the signal communication and the ready-to-receive states.

The probe system is able to be operated in different modes I, II, III (see FIG. 3). These modes I, II, III relate only to the signal transmission via radio waves in the following text. In the exemplary embodiment illustrated, radio transceivers 1.34, 2.6 have the capability of transmitting or receiving radio waves. Radio transceivers 1.34, 2.6 are not configured to transmit and receive simultaneously. Only one channel is used for the signal communication via radio waves. FIG. 3 shows different events or states across time axis t, the diagram illustrated in FIG. 3 not being true to scale. In this diagram, the lower region, which is denoted by P1 in conjunction with the curly bracket, refers to probe head 1. Accordingly, the upper region in FIG. 3 at the level of reference numeral P2 and the curly bracket refers to transceiver element 2. The lowermost line constitutes the readiness of probe head 1 or radio transceiver 1.34 to receive signals, while the uppermost line shows the ready-to-receive state of radio transceiver 2.6 of transceiver element 2. During the times in which a ready-to-receive state is present, the line is on "high," and otherwise it is on "low." The two middle lines which are printed in bolder type indicate the transmission of signals A1, S1, S1', T1, A2, S2, O2, or transmission frames, as a function of time t.

Prior to the actual measuring operation, the probe system is operated in a first mode I, in which probe head 1 is in a standby state. In this state, battery-operated probe head 1 or radio transceiver 1.34 is not ready to receive over relatively long periods of time and, in order to conserve energy, repeatedly switches itself to the ready-to-receive state only briefly during a time period $\Delta tr$. In the present exemplary embodiment, time period $\Delta tr$ during which radio transceiver 1.34 is ready to receive has a length of only 2 ms, for example. For the next 1000 ms, it is deactivated for reception. In first mode I, probe head is unable to output or transmit any signals without request, but instead is able to do so only in response to a signal S2 received from transceiver element 2. To transfer probe head 1, which may be fixed in place on a spindle of a machine tool, for example, into a measuring operation mode or into second mode II, sequential electronics 5 transmits a corresponding switch-on command to transceiver element 2. At instant $t_0$ (FIG. 3), this switch-on command triggers repeated outputting or transmission of a signal S2 by radio transceiver 2.6 in transceiver element 2, a pause being provided between the outputting of signals S2. The transmission and the pause each have a time period $\Delta ts$ of 1 ms, for example. This signal S2 includes a switch-on command, which initially does not reach its target according to FIG. 3 because probe head 1 happens not to be ready to receive in mode I directly following instant $t_0$.

However, if probe head 1 is switched to ready-to-receive according to its periodic reception activation (e.g., every 1000 ms), signal S2 is communicated to, e.g., sent to and received by, probe head 1 after several repetitions. In first mode I, probe head 1 is ready to receive during a time period $\alpha tr=2$ ms, for example, time period $\Delta ts$ during which transceiver element 2 transmits signal S2 amounting to only 1 ms, for example. The reception of signal S2 from transceiver element 2 triggers the transmission of an acknowledge signal A1 in probe head 1, which confirms the correct reception of last signal S2 by probe head 1. Transceiver element 2 receives acknowledge signal A1, which causes the termination of the transmission of signal S2 containing the switch-on command. At the same time, probe head 1 remains quiet too.

Following instant t1, which is, for example, 19 ms in this case, probe head 1 as well as transceiver element 2 are quiet for a defined time interval in a now following third mode III, both probe head 1 and transceiver element 2 being ready to receive during this time. In third mode III, probe head 1 is prepared for second mode II in the time period between t1 and t2. For example, sensor elements 1.5 are switched on with the aid of CPU 1.32, and the operating voltage in probe head 1 is generated. That probe head 1 remains ready to receive in third mode III despite the attendant relatively high current consumption constitutes a measure for reducing the interference sensitivity. This is so because transceiver element 2 would continue to send signals S2 if acknowledge signal A1 transmitted by probe head 1 would not be successfully communicated to, e.g., successfully sent to and received by, transceiver element 2. However, they would be received by probe head 1 and induce probe head 1 to transmit acknowledge signals A1 in order to then allow an orderly termination of first mode I again.

Provided neither probe head 1 nor transceiver element 2 has received signals during third mode III, the probe system switches to second mode II at instant $t_2$, in that probe head 1 transmits a signal S1 with readiness information. Probe head 1 is arranged such that it transmits signals S1 containing the readiness information at defined time intervals $\Delta tb$ (e.g., $\Delta tb=20$ ms), provided no events have occurred that speak against it. Signal S1 output at instant t2 is directly received by transceiver element 2 and, in response, induces the transmission of an acknowledge signal A2 by transceiver element 2. Once probe head 1 has transmitted a signal S1, it basically sets its radio transceiver 1.4 to ready-to-receive mode for a limited time period $\Delta tr$, in this case, 2 ms. Accordingly, probe head 1 receives acknowledge signal A2 from transceiver element 2. When time period $\Delta tr$ has elapsed, the ready-to-receive state of probe head 1 is deactivated temporarily during a time period $\Delta ti$, in order to reduce the energy requirement of probe head 1. This time period $\Delta ti$ falls largely into the time between the transmission of two adjacent signals S1 by probe head 1. In the exemplary embodiment shown, the ratio is, e.g., $\Delta tr/\Delta ti=2/18$. It is considered advantageous if the ratio $\Delta tr/\Delta ti$ is smaller than ½, in particular smaller than ¼, or smaller than ⅕, especially also in second mode II.

In second mode II, transceiver element 2 is unable to output or transmit signals without request, but instead can do so only in response to a received signal S1, T1.

As illustrated in FIG. 3, at instant $t2+\Delta tb$, probe head 1 sends another signal S1, which likewise includes the readiness information. In the exemplary embodiment illustrated, the communication of signal S1 is unsuccessful, which is symbolized by a lightning-type arrow in FIG. 3. Transceiver element 2 consequently is also unable to send an acknowledgment. Triggered by the lack of an answer from transceiver element 2 in response to signal S1 transmitted by probe head 1, probe head 1 sends another signal S1 2 ms later, which now is received by transceiver element 2 and triggers the transmission of acknowledgment signal A2 by transceiver element 2. After 20 ms according to the time intervals $\Delta tb$ starting from the most recent successfully transmitted signal S1 with the readiness information, another signal S1 with the readiness information is subsequently transmitted and then acknowledged by transceiver element 2 by acknowledge signal A2.

Figure 5:
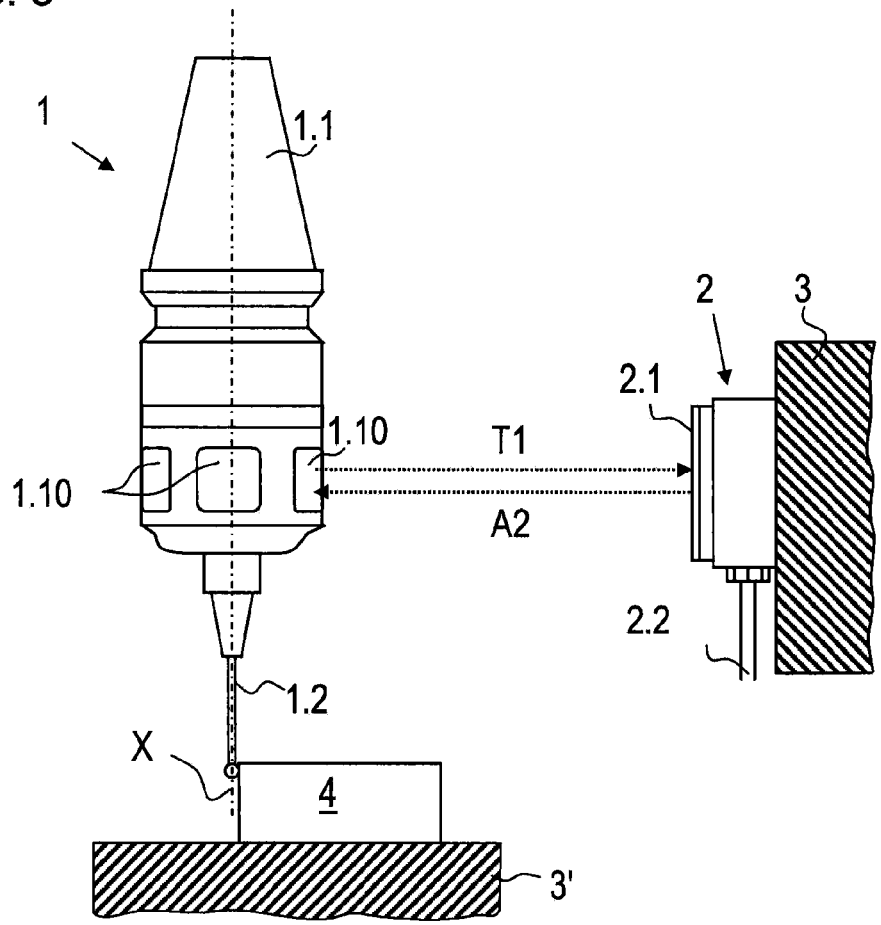
FIG. 5 illustrates the probe system in a position in which the probe head, or its stylus, contacts a workpiece.

FIG. 5 illustrates a situation in which stylus 1.2 is probe-contacting a workpiece 4 that is secured on a mounting table 3' of the machine tool. In this situation, sensor elements 1.5 generate an electric sensor pulse E1, which includes corresponding probe contact information. The occurrence of sensor pulse E1 induces probe head 1 to immediately transmit a sensor signal T1, which includes the probe contact information. Transceiver element 2 receives sensor signal T1 and confirms the receipt by transmitting acknowledge signal A2. At the same time, the probe contact information is communicated to, e.g., sent to and received by, subsequent electronics 5 and the position at which the workpiece was contacted is determined. Subsequent electronics 5 simultaneously triggers a stop of the machine tool, so that probe head 1 will no longer be moved relative to workpiece 4. Machine tools are frequently equipped with precise measuring devices that determine the spindle position, so that these measured values are used for determining the contact position. Especially in situations such as this, it is important that the signal communication has been concluded without delay, if possible. Since the probe system has high interference immunity, this marginal condition is able to be satisfied even in the relatively interference-prone signal communication via radio waves.

According to time intervals Δtb, another signal S1 including the readiness information is sent 20 ms after transmission of sensor signal T1. However, according to the exemplary embodiment, sequential electronics 5 has since communicated the command to end second mode II to transceiver element 2. In contrast to first mode I, in second mode II, transceiver element 2 is able to transmit an out-signal O2 only in response to a signal S1 transmitted from probe head 1. As a result, transceiver element 2 appends out-signal O2 to the next acknowledge signal A2 and transmits it to probe head 1 with a corresponding delay. Probe head 1, whose reception is still activated, receives acknowledge signal A2 and out-signal O2 and confirms the receipt by transmitting an additional signal S1'. This signal S1' is received by transceiver element 2 and the reception is confirmed by an acknowledge signal A2. In this phase, the information that the transmission of out-signal O2 has been concluded without a problem is available both in probe head 1 and in transceiver element 2.

The probe system thereupon enters third mode III, in which no signals are transmitted, but probe head 1 and transceiver element 2 are able to receive. Provided no signals are transmitted within a defined time interval, the probe system automatically switches to first mode I.

Although information may be communicated, e.g., sent and received, via light waves and radio waves in the probe systems in the exemplary embodiment described herein, it should be understood that the probe systems may utilize radio waves exclusively.

What is claimed is:

1. A probe system, comprising:
   a probe head having a stylus and a sensor element; and
   a transceiver element;
   wherein the probe head and the transceiver element are adapted to allow a signal communication to be established between the probe head and the transceiver element in two modes;
   wherein, in a first mode, the transceiver element is adapted to transmit a signal receivable by the probe head, and the probe head is adapted to transmit an acknowledge signal in response to receiving the signal; and
   wherein, in a second mode, the sensor element is adapted to generate a sensor signal, when the stylus is touched, transmittable by the probe head and receivable by the transceiver element, and the transceiver element is adapted to transmit an acknowledge signal in response to receiving the sensor signal.

2. The probe system according to claim 1, wherein, in the second mode, the transceiver element is adapted to transmit an additional signal, after receiving the sensor signal or another signal from the probe head, to trigger termination of the second mode.

3. The probe system according to claim 1, wherein the signal communication implementable on only one channel.

4. The probe system according to claim 1, wherein, in the first mode, the probe head is adapted to be ready to receive during a time period, and the signal is transmittable by the transceiver element during an additional time period, the time period for a ready-to-receive state being longer than the additional time period during which the signal is transmittable.

5. The probe system according to claim 1, wherein a ready-to-receive state of the probe head is temporarily deactivatable in the first mode and the second mode during a time period that at least partially falls into a time between transmission of two signals by the probe head.

6. The probe system according to claim 1, wherein in a switch between the first mode and the second mode, the probe system is operable in a third mode, in which the probe head and the transceiver element are ready to receive and in which signals are transmittable neither by the probe head nor the transceiver element.

7. A method for operating a probe system that includes a probe head including a stylus and a sensor element, and a transceiver element, the probe head and the transceiver element adapted to allow a signal communication to be established between the probe head and the transceiver element in two modes, comprising:
   in a first mode:
      transmitting a signal by the transceiver element;
      receiving the signal by the probe head; and
      transmitting an acknowledge signal by the probe head in response to receiving the signal; and
   in a second mode:
      generating a sensor signal by the sensor element when the stylus is touched;
      transmitting the sensor signal by the probe head;
      receiving the sensor signal by the transceiver element; and
      transmitting an acknowledge signal by the transceiver element in response to receiving the sensor signal.

8. The method according to claim 7, further comprising, in the second mode, after receiving the sensor signal or another signal from the probe head, transmitting an additional signal by the transceiver element that triggers termination of the second mode.

9. The method according to claim 7, wherein the signal communication is implemented on only one channel.

10. The method according to claim 7, wherein, in the first mode, the probe head is ready to receive during a first time period and the transceiver element transmits the signal during a second time period, the first time period being longer than the second time period.

11. The method according to claim 7, wherein the probe head transmits signals at defined time intervals in the second mode, and the probe head is temporarily ready to receive after one of the signals is transmitted, and a ready-to-receive state is deactivated prior to transmitting a next one of the signals.

12. The method according to claim 7, wherein the signal is sent from the transceiver element during a first time period and the probe head is ready to receive during a second time period, the second time period being longer than the first time period.

13. The method according to claim 7, further comprising operating the probe system in a third mode in a switch between the first mode and the second mode, in the third mode, the probe head and the transceiver element being ready to receive and signals being transmitted neither by the probe head nor by the transceiver element.

14. The method according to claim 7, further comprising operating the probe system in a third mode in a switch from the first mode to the second mode, in the third mode, the probe head and the transceiver element being ready to receive, signals being transmitted neither by the probe head nor the transceiver element, and the sensor element being switched on.

\* \* \* \* \*